US012661298B2

(12) United States Patent
Park

(10) Patent No.: US 12,661,298 B2
(45) Date of Patent: Jun. 23, 2026

(54) MASSAGE BALL VERTICALLY-MOVING MECHANISM FOR HYPERTHERMO-THERAPEUTIC APPARATUS

(71) Applicant: SUNGWOO MEDITECH CO., LTD., Seongnam-si (KR)

(72) Inventor: Chung Hwa Park, Seongnam-si (KR)

(73) Assignee: SUNGWOO MEDITECH CO., LTD., Seongnam-si (KR)

( * ) Notice: Subject to any disclaimer, the term of this patent is extended or adjusted under 35 U.S.C. 154(b) by 489 days.

(21) Appl. No.: 18/380,998

(22) Filed: Oct. 17, 2023

(65) Prior Publication Data

US 2024/0315916 A1 Sep. 26, 2024

(30) Foreign Application Priority Data

Mar. 23, 2023 (KR) ........................ 10-2023-0037935

(51) Int. Cl.
*A61H 15/00* (2006.01)
*A61H 15/02* (2006.01)

(52) U.S. Cl.
CPC ......... *A61H 15/02* (2013.01); *A61H 15/0078* (2013.01); *A61H 2015/0042* (2013.01); (Continued)

(58) Field of Classification Search
CPC ............................ A61H 15/02; A61H 15/0078
See application file for complete search history.

(56) References Cited

U.S. PATENT DOCUMENTS 7,494,475 B2 * 2/2009 Morita ..................... A61H 7/00
601/102
10,780,016 B2 * 9/2020 Park ..................... A61H 23/004
(Continued)

FOREIGN PATENT DOCUMENTS

CN 206381367 U 8/2017
JP 2007014467 A * 1/2007
(Continued)

OTHER PUBLICATIONS

Korean Notice of Allowance for related KR Application No. 10-2023-0037935 mailed Jul. 19, 2023 from Korean Intellectual Property Office.

*Primary Examiner* — LaToya M Louis
(74) *Attorney, Agent, or Firm* — Paratus Law Group, PLLC

(57) ABSTRACT

A massage ball vertically-moving mechanism for a hyperthermo-therapeutic apparatus, includes a hyperthermo-therapeutic massage ball; a ball support, and configured to support the hyperthermo-therapeutic massage ball and configured to vertically move; and a driving gear installed at the movable frame and configured to vertically move the ball support. A rack gear meshing with the driving gear is integrally formed with the ball support. A movable wheel is installed at the rack gear, wherein a vertical-movement guide is fixedly installed at the movable frame. A curved wheel guide groove for guiding the movable wheel during the vertical movement of the ball support is defined in the vertical-movement guide. A guide wheel is installed on one side of the vertical-movement guide so as to guide a vertical movement of the rack gear.

5 Claims, 16 Drawing Sheets

(52) U.S. Cl.
CPC ................ *A61H 2201/0146* (2013.01); *A61H 2201/0207* (2013.01); *A61H 2201/149* (2013.01); *A61H 2201/1664* (2013.01)

(56) References Cited

U.S. PATENT DOCUMENTS

| | | | | |
|---|---|---|---|---|
| 11,890,247 | B2 * | 2/2024 | Jeon | A61H 9/0078 |
| 12,005,019 | B2 * | 6/2024 | Choi | A61H 7/004 |
| 2005/0010144 | A1 * | 1/2005 | Chen | A61H 15/0078<br>601/102 |
| 2005/0192520 | A1 * | 9/2005 | Morita | A61H 15/0078<br>601/102 |
| 2009/0149784 | A1 * | 6/2009 | Morita | A61H 7/007<br>601/134 |
| 2015/0182411 | A1 * | 7/2015 | Lin | A61H 15/0078<br>601/102 |
| 2016/0193105 | A1 * | 7/2016 | Ishiguro | A61H 7/007<br>601/134 |
| 2020/0375842 | A1 * | 12/2020 | Choi | A61H 7/004 |
| 2022/0257453 | A1 * | 8/2022 | Um | A61H 15/0078 |
| 2023/0210714 | A1 * | 7/2023 | Khalid | A61H 15/0078<br>601/70 |
| 2025/0025376 | A1 * | 1/2025 | Lee | A61H 15/02 |

FOREIGN PATENT DOCUMENTS

| | | | | | |
|---|---|---|---|---|---|
| JP | 2012105990 | A | * | 6/2012 | |
| KR | 10-2012-0049797 | A | | 5/2012 | |
| KR | 10-1181918 | B1 | | 9/2012 | |
| KR | 10-1363892 | B1 | | 2/2014 | |
| KR | 102363449 | B1 | * | 2/2022 | A61H 7/004 |
| KR | 10-2022-0147491 | A | | 11/2022 | |

* cited by examiner

MASSAGE BALL VERTICALLY-MOVING MECHANISM FOR HYPERTHERMO-THERAPEUTIC APPARATUS

CROSS-REFERENCE TO RELATED APPLICATION

This application claims priority to Korean Patent Application No. 10-2023-0037935 (filed on Mar. 23, 2023), which is hereby incorporated by reference in its entirety.

BACKGROUND

The present disclosure relates to a massage ball vertically-moving mechanism for a hyperthermo-therapeutic apparatus, and more specifically, relates to a massage ball vertically-moving mechanism for a hyperthermo-therapeutic apparatus to ensure that the vertical movement of the massage ball is more stably performed during hyperthermo-therapeutic treatment using the hyperthermo-therapeutic massage ball.

Generally, a massage chair or a massage mattress is equipped with a massage module equipped with rollers to perform massage on user body parts while moving along a guide rail.

This massage module has a square-shaped movable frame, and a pairs of massage rollers supported on a support frame, wherein the rollers perform hyperthermo-therapeutic massage on each body part while performing vertical movement.

However, in the massage module in a prior art, the massage roller ball vertically pivots around a hinge shaft. Thus, a load is concentrated on the hinge shaft during the vertical movement in a pivot manner such that damage and deformation occur on the hinge shaft.

PRIOR ART LITERATURE

Patent Document 1: Korean Patent No. 1181918 registered on Sep. 5, 2012

Patent Document 2: Korean Patent No. 1363892 registered on Feb. 11, 2014

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is intended to solve the problems of the prior art as described above. A purpose of the present disclosure is to provide a massage ball vertically-moving mechanism for a hyperthermo-therapeutic apparatus to ensure that the vertical movement of the massage ball is more stably performed during hyperthermo-therapeutic treatment using the hyperthermo-therapeutic massage ball.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

An aspect of the present disclosure provides a massage ball vertically-moving mechanism for a hyperthermo-therapeutic apparatus, wherein the hyperthermo-therapeutic apparatus includes a mat and a movable frame configured to be movable along the mat, wherein the massage ball vertically-moving mechanism comprises: a hyperthermo-therapeutic massage ball; a ball support installed at the movable frame, and configured to support the hyperthermo-therapeutic massage ball and configured to vertically move; and a driving gear installed at the movable frame and configured to vertically move the ball support, wherein a rack gear meshing with the driving gear is integrally formed with the ball support, wherein a movable wheel is installed at the rack gear, wherein a vertical-movement guide is fixedly installed at the movable frame, wherein a curved wheel guide groove for guiding the movable wheel during the vertical movement of the ball support is defined in the vertical-movement guide, wherein a guide wheel is installed on one side of the vertical-movement guide so as to guide a vertical movement of the rack gear.

In one implementation of the massage ball vertically-moving mechanism for the hyperthermo-therapeutic apparatus, a guide protrusion extending in a curved manner protrudes from the rack gear, wherein the guide protrusion is supported on the guide wheel during the vertical movement of the rack gear.

In one implementation of the massage ball vertically-moving mechanism for the hyperthermo-therapeutic apparatus, the movable wheel is positioned at a low end of the rack gear.

In one implementation of the massage ball vertically-moving mechanism for the hyperthermo-therapeutic apparatus, the guide protrusion is spaced apart from the movable wheel by a predefined spacing.

In one implementation of the massage ball vertically-moving mechanism for the hyperthermo-therapeutic apparatus, the guide protrusion is coated with a protective coating layer to prevent damage due to friction with the guide wheel.

The massage ball vertically-moving mechanism in accordance with the present disclosure allows the vertical movement of the ball support having the massage ball to be guided by the guide wheel and the movable wheel, thereby preventing the failure thereof, and improving the massage efficiency, due to the load distribution.

In particular, the load distribution effect can be maximized compared to the conventional scheme in the ball pivots around the hinge shaft.

In addition to the effects as described above, specific effects in accordance with the present disclosure will be described together with following detailed descriptions for carrying out the disclosure.

DETAILED DESCRIPTIONS

Figure 1:
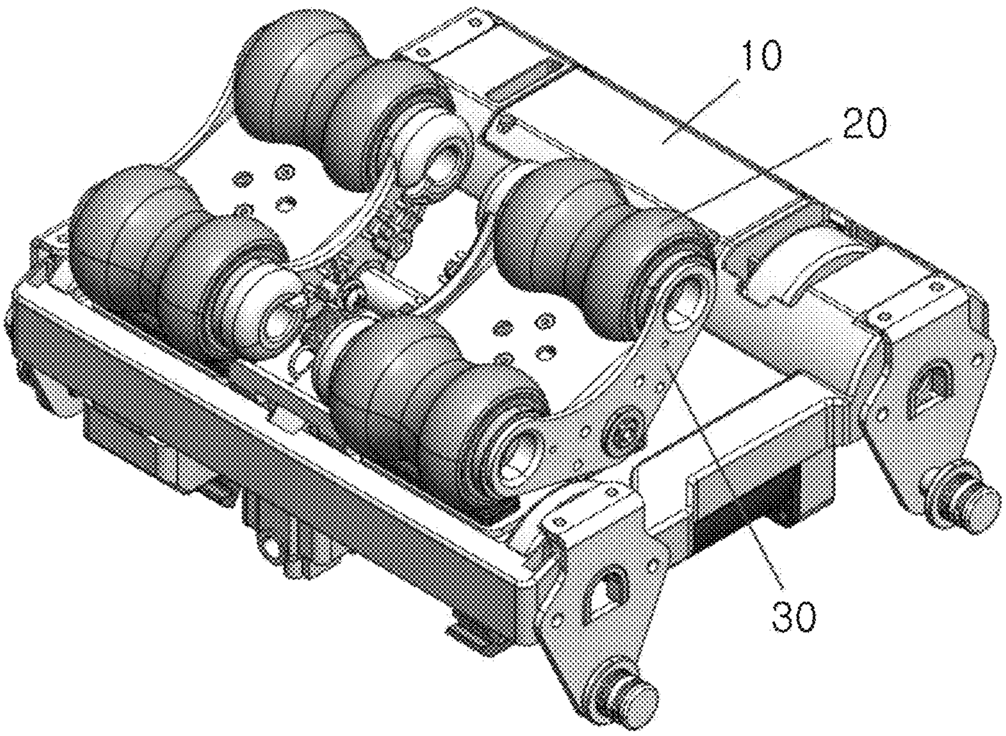
FIG. 1 is a perspective view of a massage ball vertically-moving mechanism for the hyperthermo-therapeutic massage apparatus in accordance with the present disclosure.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may include within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between and connected to the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like may be disposed "on" or "on a top" of another layer, film, region, plate, or the like, the former may directly contact the latter or still another layer, film, region, plate, or the like may be disposed between and connected to the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between and connected to the former and the latter. Further, as used herein, when a layer, film, region, plate, or the like may be disposed "below" or "under" another layer, film, region, plate, or the like, the former may directly contact the latter or still another layer, film, region, plate, or the like may be disposed between and connected to the former and the latter. As used herein, when a layer, film, region, plate, or the like is directly disposed "below" or "under" another layer, film, region, plate, or the like, the former directly contacts the latter and still another layer, film, region, plate, or the like is not disposed between and connected to the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may be actually executed at the same time. Depending on a related function or operation, the blocks may be executed in a reverse sequence.

The features of the various embodiments of the present disclosure may be partially or entirely combined with each other, and may be technically associated with each other or operate with each other. The embodiments may be implemented independently of each other and may be implemented together in an association relationship.

Spatially relative terms, such as "beneath," "below," "lower," "under," "above," "upper," and the like, may be used herein for ease of explanation for illustrating one element or feature's relationship to another element or feature as illustrated in the figures. It will be understood that the spatially relative terms are intended to encompass different orientations of the device in use or in operation, in addition to the orientation depicted in the figures. For example, when the device in the drawings may be turned over, elements described as "below" or "beneath" or "under" other elements or features would then be oriented "above" the other elements or features. Thus, the example terms "below" and "under" may encompass both an orientation of above and below. The device may be otherwise oriented, for example, rotated 90 degrees or at other orientations, and the spatially relative descriptors used herein should be interpreted accordingly.

Hereinafter, preferred embodiments of the present disclosure will be described with reference to the attached drawings.

First, a configuration of the massage ball vertically-moving mechanism for the hyperthermo-therapeutic apparatus according to an embodiment of the present disclosure will be described with reference to FIG. 1 to FIG. 9.

Figure 2:
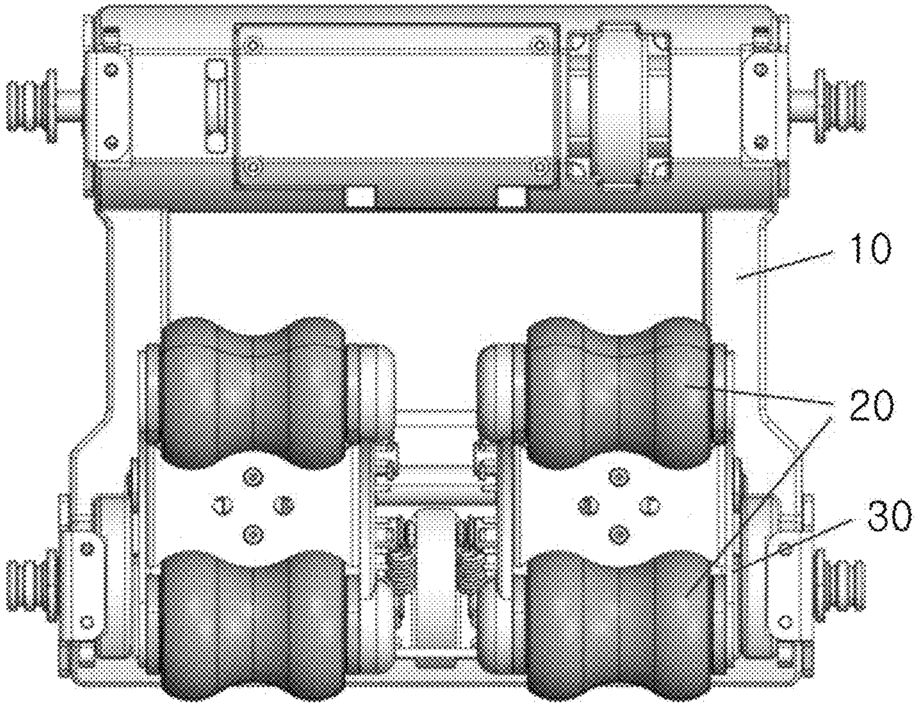
FIG. 2 is a plan view of the massage ball vertically-moving mechanism for the hyperthermo-therapeutic massage apparatus in accordance with the present disclosure.
Figure 3:
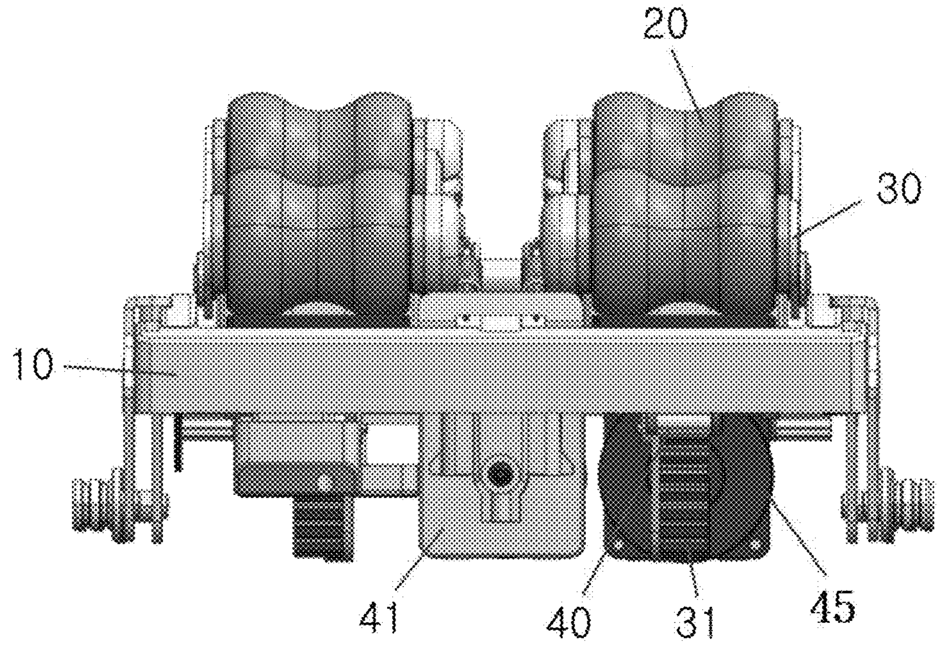
FIG. 3 is a front view of the massage ball vertically-moving mechanism for the hyperthermo-therapeutic massage apparatus in accordance with the present disclosure.
Figure 4:
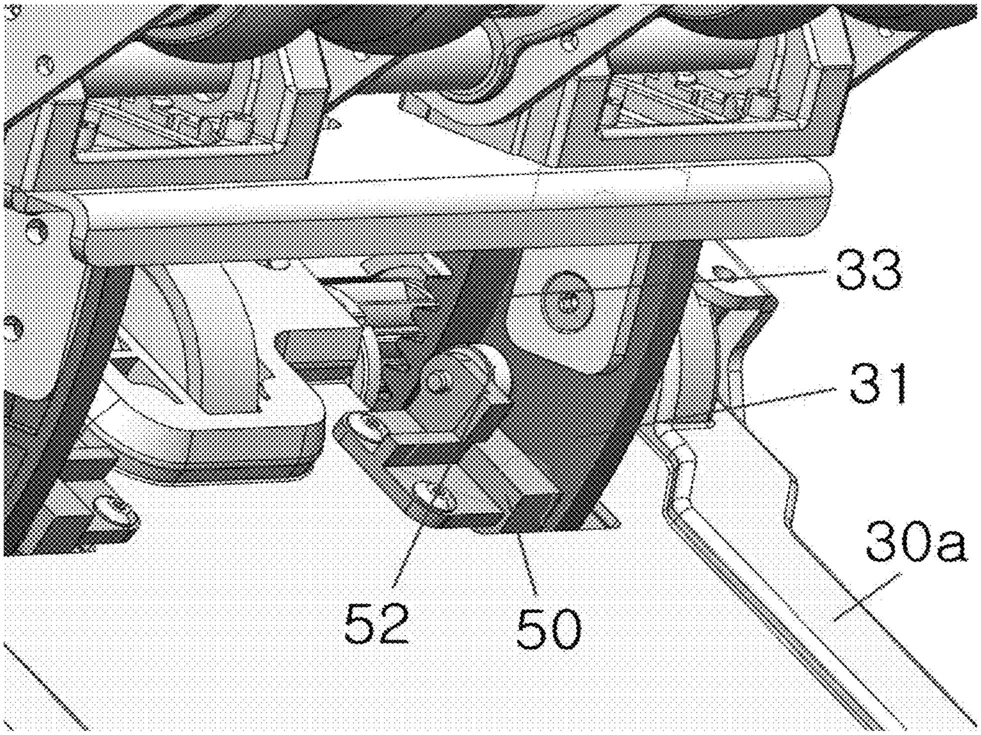
FIG. 4 is a detailed view of major components of the massage ball vertically-moving mechanism for the hyper-thermo-therapeutic massage apparatus in accordance with the present disclosure.
Figure 5:
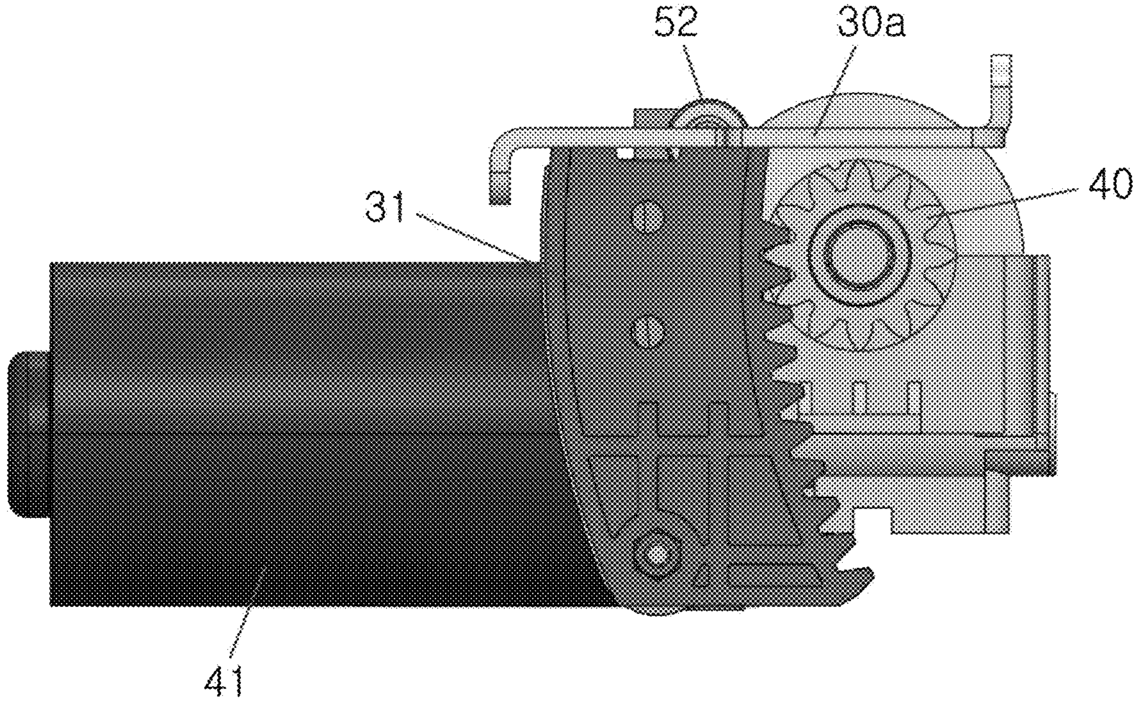
FIG. 5 is a side view of major components of the massage ball vertically-moving mechanism for the hyperthermo-therapeutic massage apparatus in accordance with the present disclosure.
Figure 6:
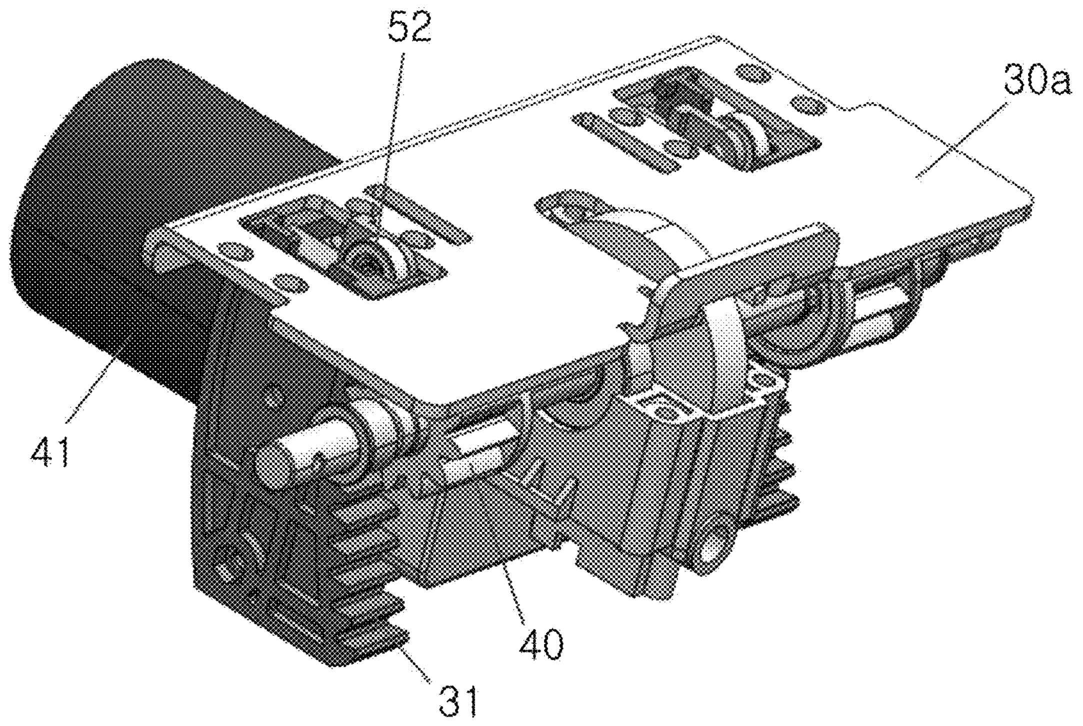
FIG. 6 is a perspective view of major components of the massage ball vertically-moving mechanism for the hyper-thermo-therapeutic massage apparatus in accordance with the present disclosure.
Figure 7:
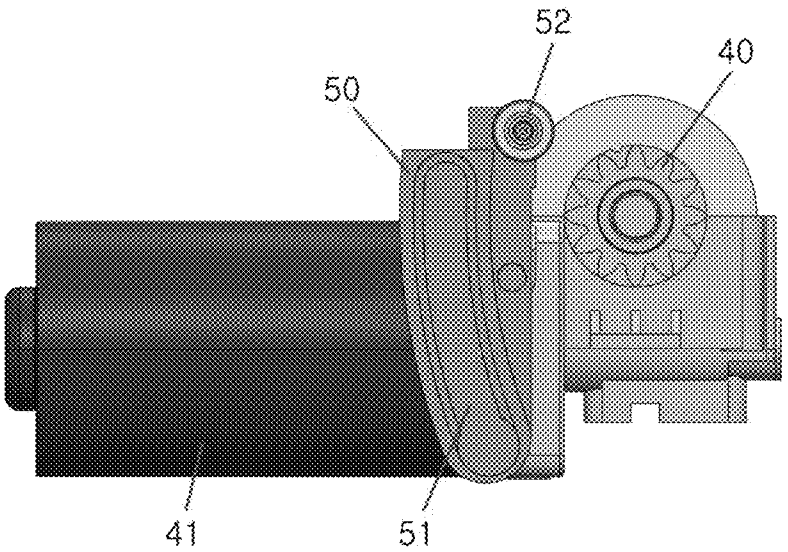
FIG. 7 and FIG. 8 are side and perspective views of major components of the massage ball vertically-moving mechanism for the hyperthermo-therapeutic massage apparatus in accordance with the present disclosure.
Figure 8:
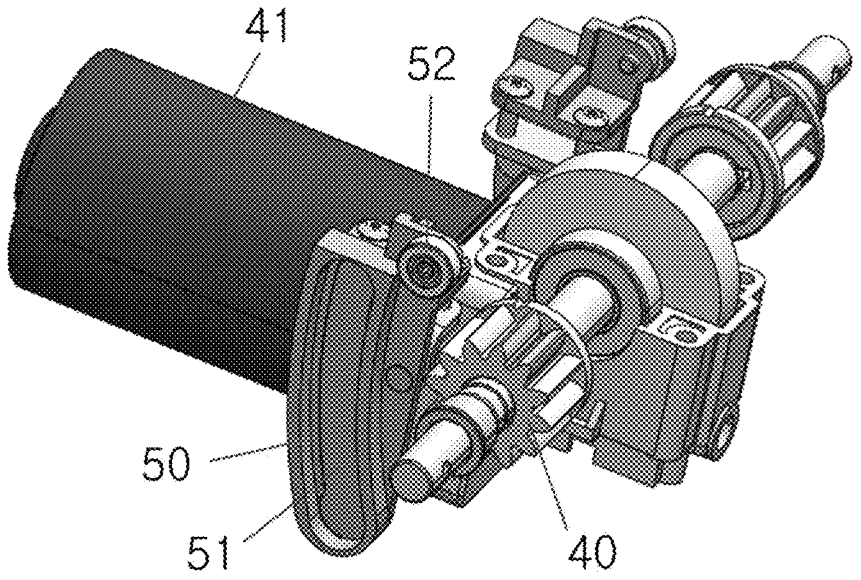
Figure 9:
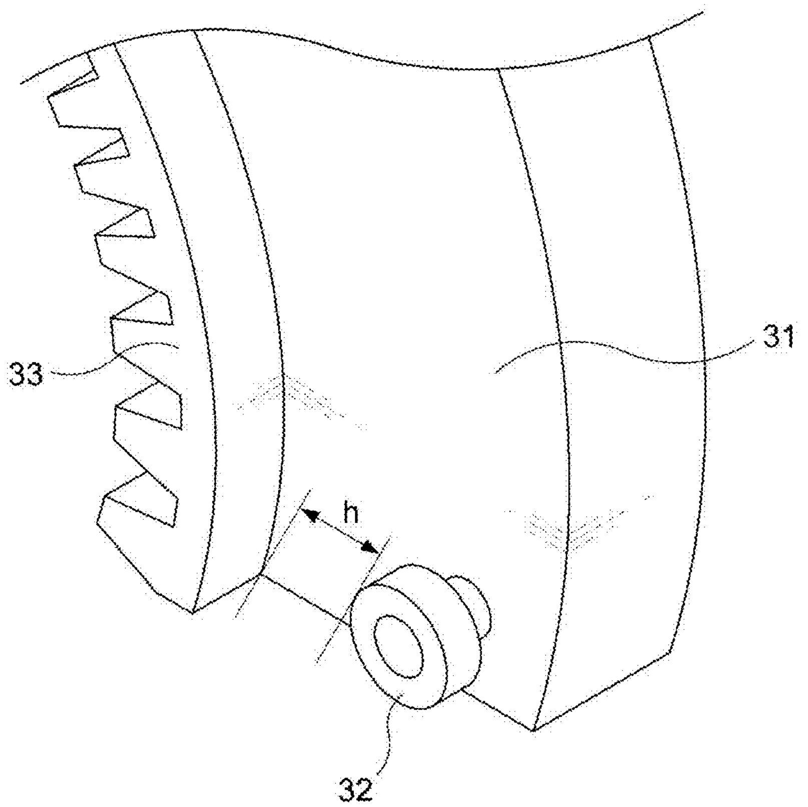
FIG. 9 is a detailed view of main parts of a rack gear in accordance with the present disclosure.

FIG. 1 is a perspective view of a massage ball vertically-moving mechanism for the hyperthermo-therapeutic massage apparatus in accordance with the present disclosure. FIG. 2 is a plan view of the massage ball vertically-moving mechanism for the hyperthermo-therapeutic massage apparatus in accordance with the present disclosure. FIG. 3 is a front view of the massage ball vertically-moving mechanism for the hyperthermo-therapeutic massage apparatus in accordance with the present disclosure. FIG. 4 is a detailed view of major components of the massage ball vertically-moving mechanism for the hyperthermo-therapeutic massage apparatus in accordance with the present disclosure. FIG. 5 is a side view of major components of the massage ball vertically-moving mechanism for the hyperthermo-therapeutic massage apparatus in accordance with the present disclosure. FIG. 6 is a perspective view of major components of the massage ball vertically-moving mechanism for the hyperthermo-therapeutic massage apparatus in accordance with the present disclosure. FIG. 7 and FIG. 8 are side and perspective views of major components of the massage ball vertically-moving mechanism for the hyperthermo-therapeutic massage apparatus in accordance with the present disclosure. FIG. 9 is a detailed view of main parts of a rack gear in accordance with the present disclosure.

In the hyperthermo-therapeutic apparatus according to an embodiment of the present disclosure, a movable frame 10 moves along a mat. In the massage ball vertically-moving mechanism in this embodiment, a ball support 30 including a hyperthermo-therapeutic massage ball 20 is installed at the movable frame 10 and is configured to vertically move. In this regard, the hyperthermo-therapeutic massage ball 20 may include a heater wire or a PTC element for hyperthermo-therapeutic treatment. The hyperthermo-therapeutic structure and the configuration in which the movable frame 10 moves along the mat are well known in the art. Therefore, detailed descriptions thereof will be omitted.

A driving gear 40 for enabling the vertical movement of the ball support may be installed at the movable frame 10 in accordance with the present disclosure. The ball support 30 has a rack gear 31 which is integrally formed therewith and meshes with the driving gear 40. A movable wheel 32 is formed at a lower end of the rack gear 31. A vertical-movement guide 51 is fixedly installed at the movable frame 10. A curved wheel guide groove 51 for guiding the movable wheel 32 during the vertical movement of the ball support 30 is defined in the vertical-movement guide 51. A guide wheel 52 is installed on one side of the vertical-movement guide 50 so as to guide a vertical movement of the rack gear 31.

In one implementation of the massage ball vertically-moving mechanism for the hyperthermo-therapeutic apparatus, a guide protrusion 33 extending in a curved manner protrudes from the rack gear 31, wherein the guide protrusion 33 is supported on the guide wheel 52 during the vertical movement of the rack gear 31.

In one implementation of the massage ball vertically-moving mechanism for the hyperthermo-therapeutic apparatus, the guide protrusion 33 is spaced apart from the movable wheel 52 by a predefined spacing h.

In one implementation of the massage ball vertically-moving mechanism for the hyperthermo-therapeutic apparatus, the ball support 30 has a ball support base 30*a*. A drive motor 41 transmits forward and reverse rotation power to the driving gear 40. A further drive motor 45 transmits a movement fore to the movable frame 10.

Hereinafter, an operation of the massage ball vertically-moving mechanism will be described in FIG. 10 to FIG. 16.

Figure 10:
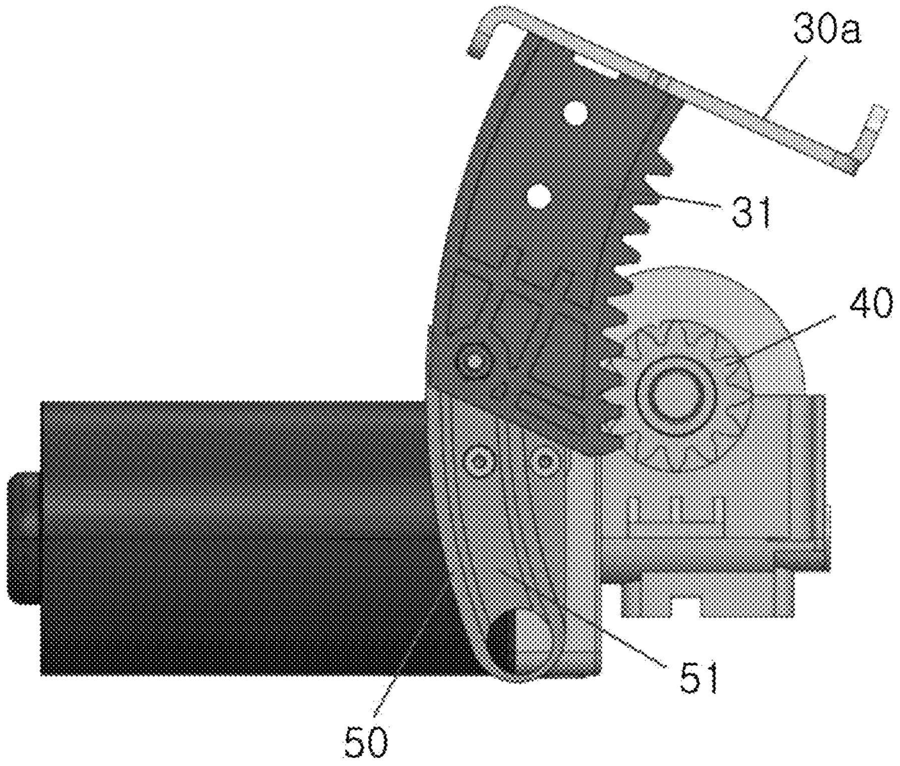
FIG. 10 and FIG. 11 are diagrams of a state in which the rack gear has been raised up in accordance with the present disclosure.
Figure 11:
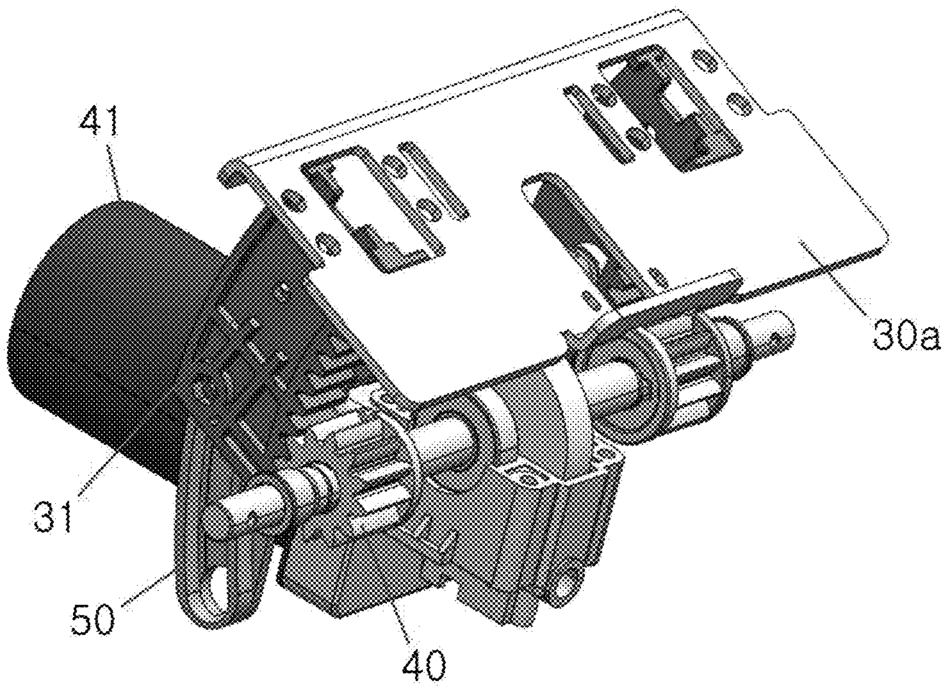
Figure 12:
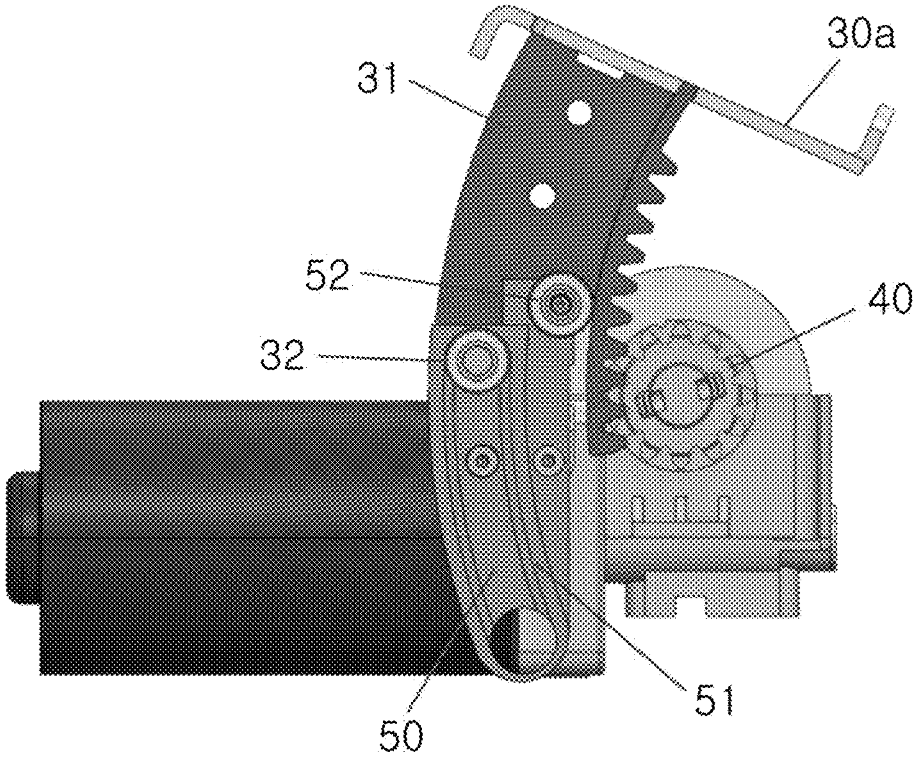
FIG. 12 is a partial cut side view of a state in which the rack gear has been raised up in accordance with the present disclosure.
Figure 13:
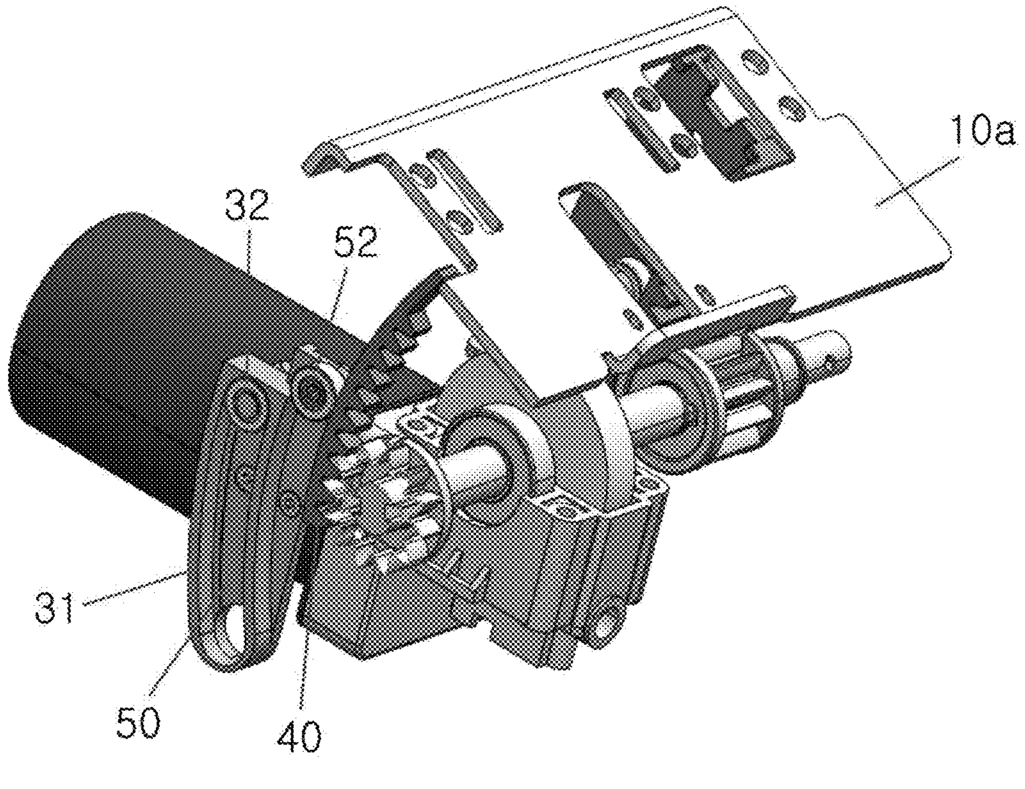
FIG. 13 is a partially cut perspective view of a state in which the rack gear has been raised up in accordance with the present disclosure.
Figure 14:
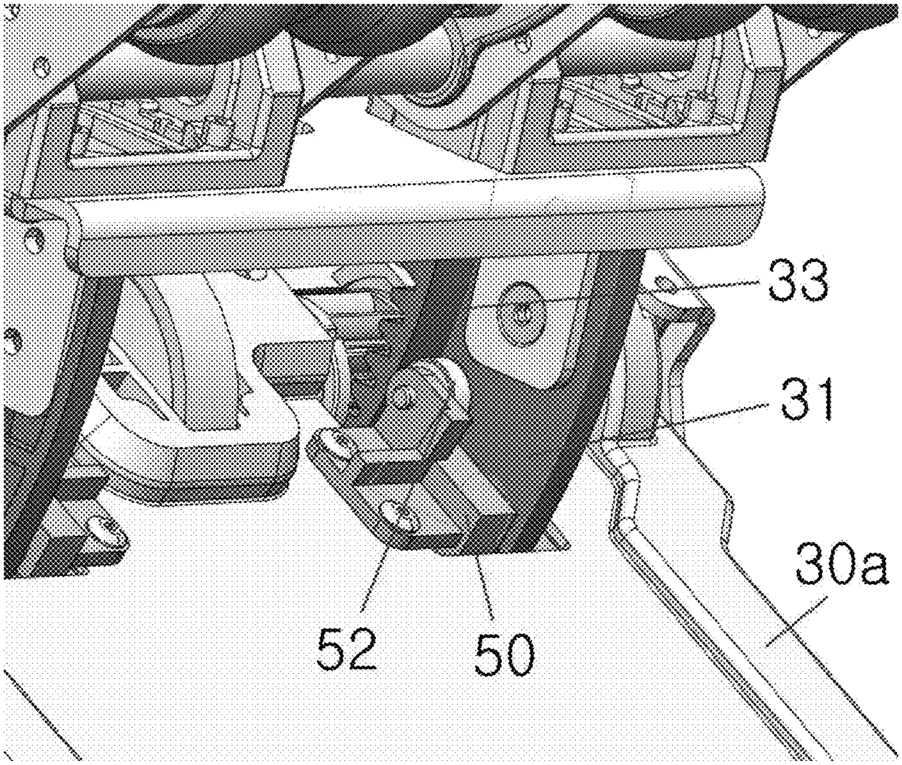
FIG. 14 is a rear detailed view of a state in which the rack gear has been raised up in accordance with the present disclosure.
Figure 15:
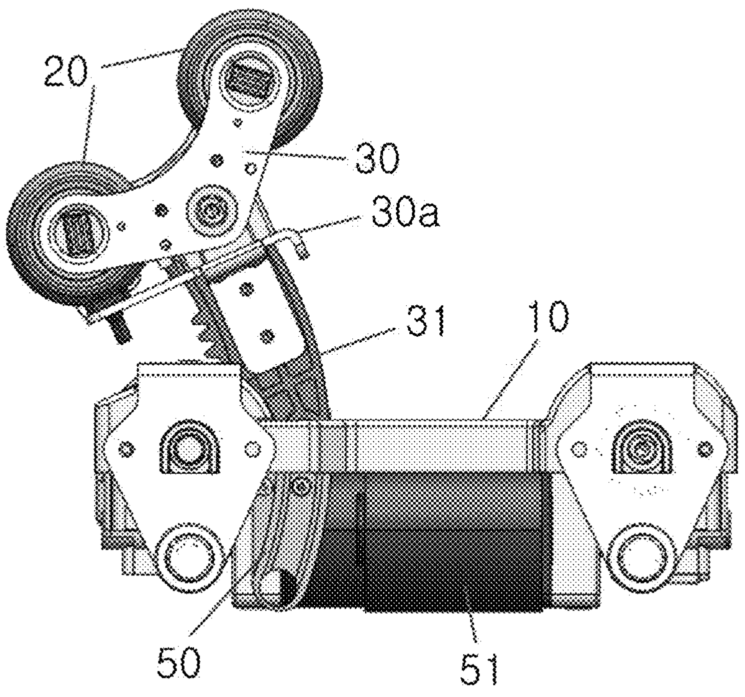
FIG. 15 is a side view of a state in which the ball has been raised up in accordance with the present disclosure.
Figure 16:
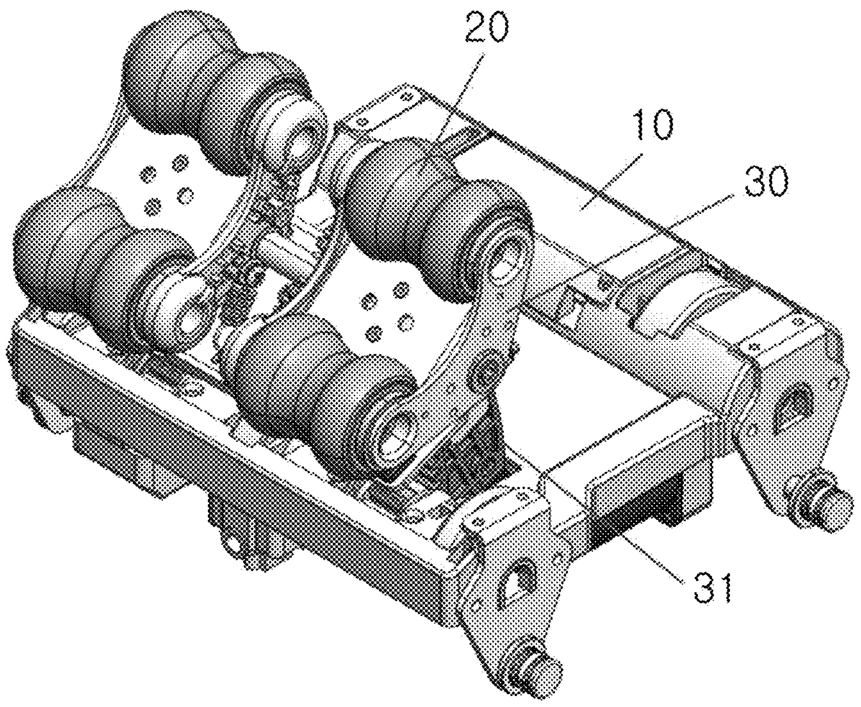
FIG. 16 is a perspective view of a state in which the ball has been raised up in accordance with the present disclosure.

FIG. 10 and FIG. 11 are diagrams of a state in which the rack gear has been raised up in accordance with the present disclosure. FIG. 12 is a partial cut side view of a state in which the rack gear has been raised up in accordance with the present disclosure. FIG. 13 is a partially cut perspective view of a state in which the rack gear has been raised up in accordance with the present disclosure. FIG. 14 is a rear detailed view of a state in which the rack gear has been raised up in accordance with the present disclosure. FIG. 15 is a side view of a state in which the ball has been raised up in accordance with the present disclosure. FIG. 16 is a perspective view of a state in which the ball has been raised up in accordance with the present disclosure.

In the massage ball vertically-moving mechanism in accordance with the present disclosure, the hyperthermo-therapeutic massage therapy may be achieved by vertically moving the hyperthermo-therapeutic massage ball 20 on and along the user body part while moving the movable frame 10 along a rail provided on the mat.

In other words, when the rack gear 31 engaged with the drive gear 40 moves upwards under one-way rotation of the driving gear 40, the movable wheel 32 formed at the lower end of the rack gear 31 may be guided along the wheel guide groove 51 formed in the vertical-movement guide 50.

In this regard, the guide wheel 52 is provided at an upper end of the vertical-movement guide 50. Thus, the guide protrusion 33 is supported on the guide wheel 52 during the vertical movement of the rack gear 31. Thus, stable vertical movement of the rack gear can be achieved while preventing shaking the ball support 30.

The massage ball vertically-moving mechanism in accordance with the present disclosure allows the vertical movement of the ball support 30 having the massage ball 20 to be guided by the guide wheel 52 and the movable wheel 32, thereby preventing the failure thereof, and improving the massage efficiency, due to the load distribution.

In particular, the load distribution effect can be maximized compared to the conventional scheme in the ball pivots around the hinge shaft.

Figure 17:
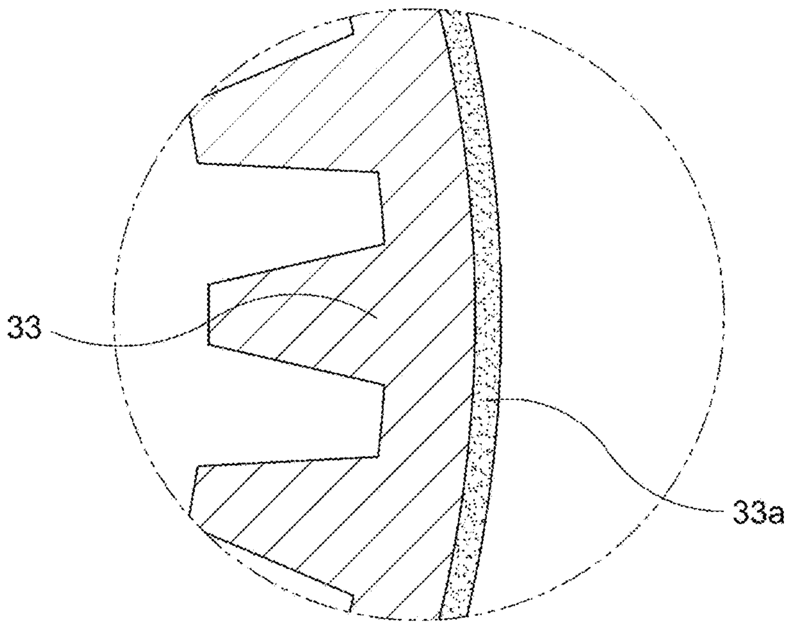
FIG. 17 is a detailed cross-sectional view of main parts of a rack gear according to another embodiment of the present disclosure.

FIG. 17 shows another embodiment of the present disclosure. The guide protrusion 33 is coated with a protective coating layer 33*a* to prevent damage due to friction with the guide wheel 52.

Although the embodiments of the present disclosure have been described above with reference to the accompanying drawings, the present disclosure may not be limited to the embodiments and may be implemented in various different forms. Those of ordinary skill in the technical field to which the present disclosure belongs will be able to understand that the present disclosure may be implemented in other specific forms without changing the technical idea or essential features of the present disclosure. Therefore, it should be understood that the embodiments as described above are not restrictive but illustrative in all respects.

What is claimed is:

1. A massage ball vertically-moving mechanism for a hyperthermo-therapeutic apparatus, wherein the hyperthermo-therapeutic apparatus includes a mat and a movable frame configured to be movable along the mat, wherein the massage ball vertically-moving mechanism comprises:

a hyperthermo-therapeutic massage ball;

a ball support installed at the movable frame, and configured to support the hyperthermo-therapeutic massage ball and configured to vertically move; and a driving gear installed at the movable frame and configured to vertically move the ball support, wherein a rack gear meshing with the driving gear is integrally formed with the ball support, wherein a movable wheel is installed at the rack gear, wherein a vertical-movement guide is fixedly installed at the movable frame, wherein a curved wheel guide groove for guiding the movable wheel during the vertical movement of the ball support is defined in the vertical-movement guide, wherein a guide wheel is installed on one side of the vertical-movement guide so as to guide a vertical movement of the rack gear.

2. The massage ball vertically-moving mechanism for the hyperthermo-therapeutic apparatus of claim 1, wherein a guide protrusion extending in a curved manner protrudes from the rack gear, wherein the guide protrusion is supported on the guide wheel during the vertical movement of the rack gear.

3. The massage ball vertically-moving mechanism for the hyperthermo-therapeutic apparatus of claim 2, wherein the guide protrusion is spaced apart from the movable wheel by a predefined spacing.

4. The massage ball vertically-moving mechanism for the hyperthermo-therapeutic apparatus of claim 2, wherein the guide protrusion is coated with a protective coating layer to prevent damage due to friction with the guide wheel.

5. The massage ball vertically-moving mechanism for the hyperthermo-therapeutic apparatus of claim 1, wherein the movable wheel is positioned at a low end of the rack gear.

* * * * *